(12) United States Patent
Chong

(10) Patent No.: US 6,745,296 B2
(45) Date of Patent: Jun. 1, 2004

(54) SYSTEM AND METHOD FOR PROVIDING CACHEABLE SMRAM

(75) Inventor: HonFei Chong, Santa Cruz, CA (US)

(73) Assignee: Phoenix Technologies, Ltd., Milpitas, CA (US)

( * ) Notice: Subject to any disclaimer, the term of this patent is extended or adjusted under 35 U.S.C. 154(b) by 112 days.

(21) Appl. No.: 09/837,359

(22) Filed: Apr. 18, 2001

(65) Prior Publication Data

US 2002/0156981 A1 Oct. 24, 2002

(51) Int. Cl.[7] .............................................. G06F 12/00
(52) U.S. Cl. ...................... 711/138; 139/142; 139/143
(58) Field of Search ................................. 711/138, 139, 711/141, 142, 143, 118, 144–145, 156, 154

(56) References Cited

U.S. PATENT DOCUMENTS

| | | | | |
|---|---|---|---|---|
| 5,544,344 A | * | 8/1996 | Frame et al. ................ | 711/144 |
| 5,638,532 A | * | 6/1997 | Frame et al. ................ | 711/154 |
| 6,453,278 B1 | * | 9/2002 | Favor et al. ................. | 703/27 |

* cited by examiner

Primary Examiner—Kimberly McLean-Mayo

(57) ABSTRACT

Computer systems and methods that provide for cacheable above one megabyte system management random access memory (SMRAM). The systems and methods comprise a central processing unit (CPU) having a processor and a system management interrupt (SMI) dispatcher, a cache coupled to the CPU, and a chipset memory controller that interfaces the CPU to a memory. The memory includes system memory and the system management random access memory. The systems and methods un-cache the SMRAM while operating outside of system management mode, transfer CPU operation to system management mode upon execution of a system management interrupt (SMI), and change cache settings to cache the extended memory and system management random access memory with write-through. The systems and methods then change cache settings to cache the extended memory with write-back and un-cache the SMRAM upon execution of an resume instruction.

20 Claims, 2 Drawing Sheets

SYSTEM AND METHOD FOR PROVIDING CACHEABLE SMRAM

BACKGROUND

The present invention relates generally to computer systems and methods, and more particularly, to a system and method that provides cacheable SMRAM.

The assignee of the present invention develops firmware for computer systems known as a basic input and output system, or BIOS, along with other firmware and software that is employed in personal computer systems. In certain processors manufactured by Intel, for example, system management mode (SMM) is a special-purpose operating mode that is provided to handle system-wide functions such as power management, system hardware control, or proprietary OEM-designed code.

SMM is intended for use by system firmware, not by applications software or general-purpose systems software. SMM provides a distinct and easily isolated processor environment that operates transparently with respect to the operating system or executive and software applications.

When a processor is executing SMM code, it is said to be in SMM mode. At all other times the processor is executing foreground code in real or protected mode and is said to be in foreground mode.

When SMM is invoked through a system management interrupt (SMI), the current state of the processor (the processor's context) is saved, and the processor switches to SMM in a separate operating environment contained in system management RAM (SMRAM). While in SMM, the processor executes SMI handler code to perform operations such as powering down unused disk drives or monitors, executing proprietary code, or placing the system in a suspended state.

When the SMI handler has completed its operations, it executes a resume instruction. The resume instruction causes the processor to reload its saved context, switch back to foreground mode, and resume execution of foreground code.

The processor handles an SMI on an architecturally defined "interruptible" point in program execution (which is commonly at an Intel Architecture instruction bound-ary). When the processor receives an SMI, it waits for all instructions to retire and for all stores to complete. The processor then saves its current context in SMRAM, enters SMM, and begins to execute the SMI handler.

The only way to exit from SMM is to execute the resume instruction. The resume instruction is only available in SMM. The resume instruction restores the processor's context by loading the state save image from SMRAM back into the processor's registers. It then returns program control back to the interrupted or foreground program code.

In conventional computer systems, executing code above one megabyte of SMRAM with a write-back cache enabled has the potential to destroy the data in SMRAM area and hang the system. This is because cache line fills caused by reads and writes to addresses occupied by the SMRAM area while executing code outside of SMM (in foreground mode) may not actually be written back until a later time when executing code in SMM.

Since reads to these memory locations that are made while executing code outside of SMM fill the cache with unknown data (such as 0xFFFFFFFFh, for example), these values are later written in SMRAM while dispatching an SMI. Also if reads to the memory locations that have the SMI dispatcher codes while executing code outside of SMM fill the cache with some unknown data, the system will hang in SMM as the SMI is generated. This means that a program, driver or virus that reads or writes these addresses could cause the system to fail or hang.

Executing code above one megabyte of SMRAM with the write-back cache disabled is one potential solution that avoids corruption of the data above one megabyte of SMRAM. However, this solution increases the latency of the SMI, which may be more than a maximum acceptable latency of 500 microseconds.

Another option is to not use TSEG/HSEG chipset features and use a portion of system memory as the SMRAM. However, this type of SMRAM area is not secure while operating outside of SMM.

A computer search of the US Patent and Trademark Office patent database was performed which uncovered a number of possible prior art patents. Patents uncovered in the search included U.S. Pat. Nos. 5,544,344, 5,638,532, 5,954,812, 5,596,741, and 5,475,829. A review of these patents reveals that these patents are generally unrelated to the specifics of the present invention.

It is therefore an objective of the present invention to provide a method and apparatus that implement a cacheable above one megabyte SMRAM.

SUMMARY OF THE INVENTION

To accomplish the above and other objectives, the present invention comprises systems and methods that provide for cacheable above one megabyte SMRAM. Exemplary systems and methods comprise a central processing unit (CPU) including a processor (or microprocessor), a system management interrupt (SMI) dispatcher (which is typically part of system firmware or basic input/output system (BIOS)), a level 1 (L1) cache, and a level 2 (L2) cache. The CPU is coupled by way of the bus interface and a bus to a chipset memory controller that interfaces to a memory. The memory comprises a lower memory (referred to as system memory), an upper memory, and an extended memory containing SMRAM.

The systems and methods provide for cacheable above one megabyte SMRAM as follows. The present invention secures the SMRAM while operating outside of SMM. The present invention gains the benefit of caching by enabling TSEG/HSEG chipset features and performing various caching and un-caching operations. The TSEG/HSEG chipset features function to define the boundaries of the SMRAM.

The present invention sets the SMRAM to be uncacheable while operating outside of SMM. When an SMI is generated, the CPU operation is transferred to the SMM. The SMI dispatcher changes cache settings to cache the extended memory and the SMRAIM with write-through. The SMI dispatcher caches the extended memory with write-back and sets the SMRAM to be uncacheable upon generation of a resume instruction (exit system management interrupt, or exit SMI) which exits the SMM.

In operation, the SMM is invoked by a SMI. The CPU informs the chipset that it is in SMM, and the chipset memory controller opens the SMRAM (including setting an AB segment, along with TSEG and HSEG segments). Thus, the chipset memory controller enables the CPU to access the SMRAM. The CPU saves the current state of the processor to SMRAM.

The CPU executes the SMI dispatcher (or SMI handler). In accordance with the present invention, the SMI dispatcher changes the caching setting as soon as possible to set the extended memory and TSEG/HSEG to be cacheable with write-through. The SMI dispatcher then services the SMI event (i.e., the event that invoked SMI). Then, the SMI dispatcher changes the caching setting to cache the extended memory with write-back and sets the TSEG/HSEG to be uncacheable.

After the SMI handler or dispatcher has completed its operation, it executes a resume (RSM) instruction. This instruction causes the processor to reload the saved context of the CPU, switch back to non-SMM mode. The chipset memory controller is informed that CPU switched back to non-SMM mode, and it closes the SMRAM, so that the CPU cannot access SMRALM.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
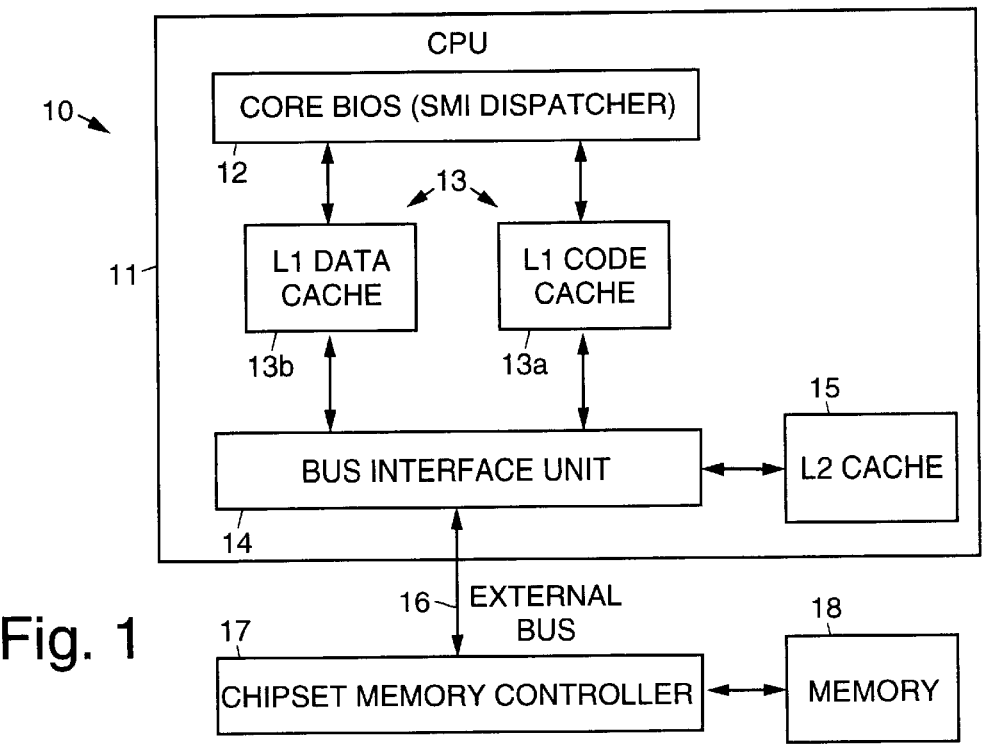
FIG. 1 illustrates a portion of an exemplary computer system in accordance with the principles of the present invention that provides for cacheable above one megabyte SMRAM.

Referring to the drawing figures, FIG. 1 illustrates a portion of an exemplary computer system 10 that provides for cacheable above one megabyte system management random access memory in accordance with the principles of the present invention. The computer system 10 includes, but is not limited to, a central processing unit (CPU) 11 that includes a processor or microprocessor (not shown), a system management interrupt (SMI) dispatcher 12 (which is typically part of system firmware or basic input/output system (BIOS)), a level 1 (L1) cache 13, illustrated as L1 data cache 13a and L1 code cache 13b, and a level 2 (L2) cache 15. The CPU 11 is coupled by way of the bus interface 14 and a bus 16 to a chipset memory controller 17 that interfaces to a memory 18.

Figure 2:
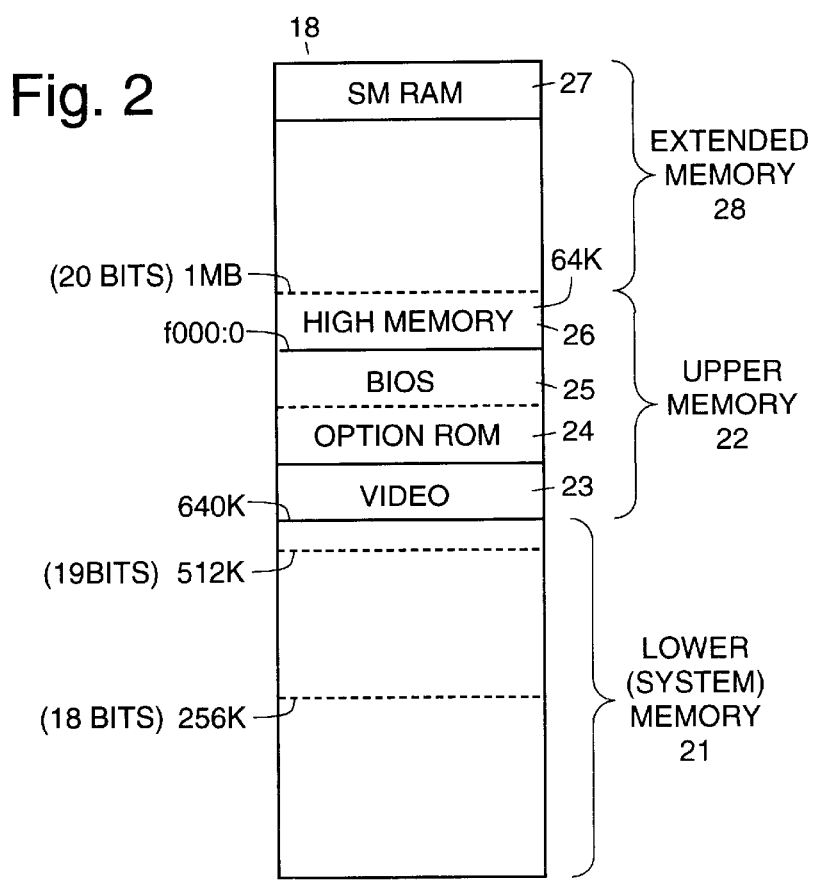
FIG. 2 illustrates exemplary memory 18 employed by the computer 10 shown in FIG. 1. The memory 18 is arranged or partitioned to have a lower memory (or system) memory) 21, an upper memory 22, and an extended memory 18 containing system management random access memory (SMRAM) 17. The memory 18 is typically greater than 1 megabyte in size.

FIG. 2 illustrates exemplary memory 18 employed the computer system 10 shown in FIG. 1. The memory 18 is arranged or partitioned to have a lower memory (or system memory) 21, an upper memory 22, and an extended memory 28 containing system management random access memory (SMRAM) 27. The memory 18 is typically greater than 1 megabyte in size.

In the exemplary system 10, the lower memory (or system memory) 21 may be 640 kilobytes in size and the upper memory 22 may be 384 kilobytes in size, the size of extended memory 28 depends upon the number of DRAM chips that are used in the system 10. Video RAM space 23 is located in the upper memory 22 just above the 640 kilobyte lower memory 21 demarcation line.

Option read only memory (ROM) space 24 is allocated above the video RAM space 23. BIOS memory space 25 for the basic input/output system (BIOS) is allocated above the option ROM space 24. The size of video RAM space 23 plus the option ROM space 24 plus the BIOS memory space 25 is 384 kilobytes. The option ROM space 24 and the BIOS memory space 25 are hardware addressable.

The present invention provides for secure SMRAM 27 while operating outside of SMM. Thus, when using the present invention, the SMRAM 27 is not destroyed when the system switches to SMM.

The system 10 and method 30 provide for cacheable above one megabyte SMRAM 27 as follows. The present invention secures the SMRAM 27 while operating outside of SMM. The present invention gains the benefit of caching by enabling TSEG/HSEG chipset features in the chipset memory controller 17 and performing caching and un-caching operations. The TSEG/HSEG chipset features function to define the boundaries of the SMRAM 27.

Details regarding TSEG/HSEG chipset features are documented by Intel Corporation. In general, however, TSEG is a block of system memory (from :) that is only accessible by the processor and only while operating in SMM. TOM stands for top of memory or top of low memory, the highest address of physical memory that below 4G. HSEG is a remap of the AB segment below 4G and above TOM (FEEA000:FEEBFFFF, for example).

Figure 3:
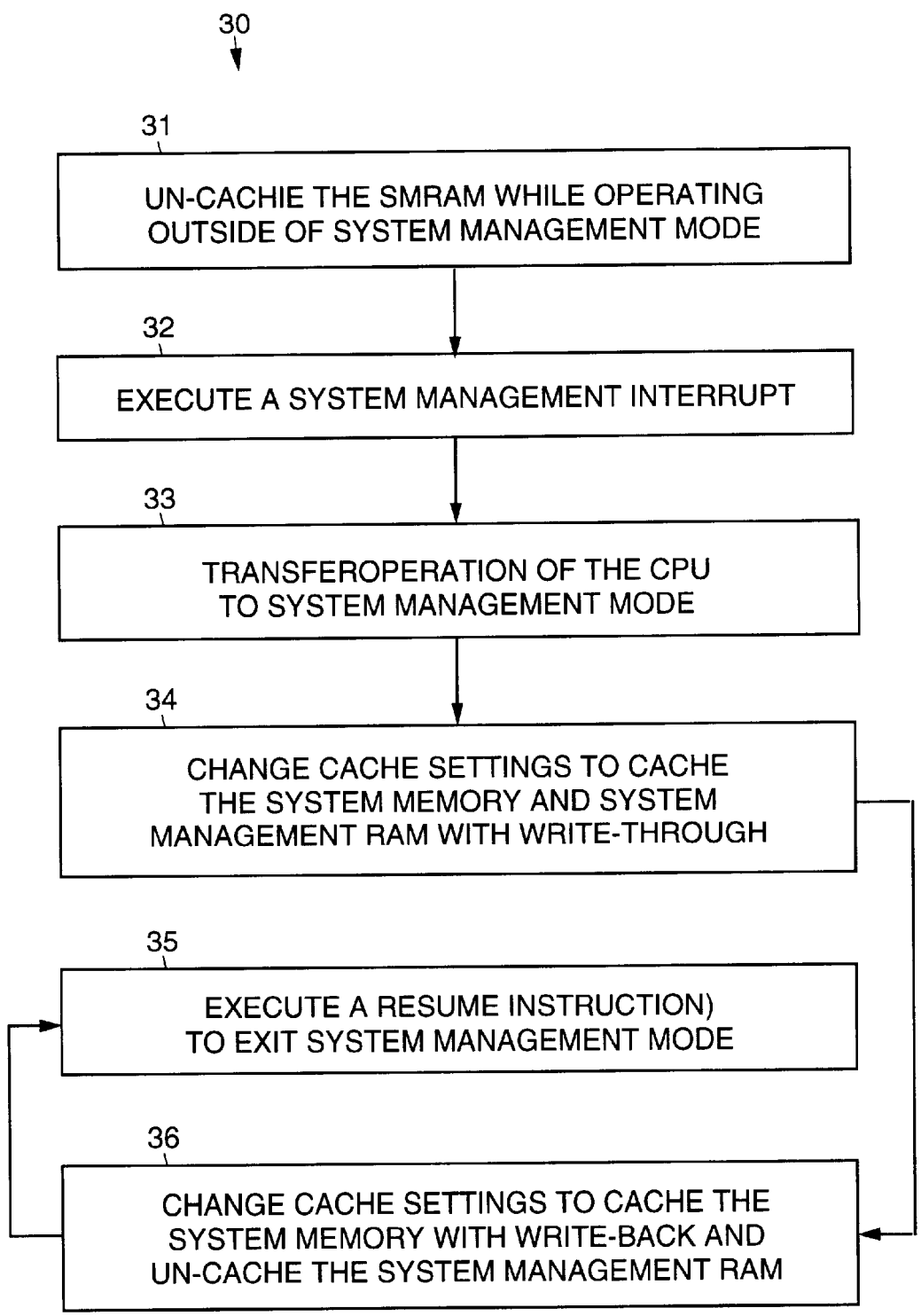
FIG. 3 is a flow diagram illustrating one exemplary method in accordance with the principles of the present invention that provides for cacheable above one megabyte SMRAM.

Referring to FIG. 3, which is a flow diagram illustrating an exemplary method 30 in accordance with the principles of the present invention that provides for cacheable above one megabyte SMRAM 27. While operating outside of SMM, the SMRAM 27 is set to be uncacheable at block 31. When an SMI is executed at block 32, the CPU 11 is then transferred to the SMM and it executes SMI dispatcher 12 at block 33. The SMI dispatcher 12 changes cache settings to cache the extended memory 28 and SMRAM 27 with write-through at block 34. After the SMI event is serviced at block 35 the SMI dispatcher 12 changes cache settings to cache the extended memory 28 with write-back and set the SMRAM 27 to be uncacheable. Thereafter, at block 36, a resume instruction is executed which exits the system management mode.

Thus, the SMM is invoked by an SMI at block 32. The CPU 11 informs the chipset memory controller 17 that it is in SMM, and the chipset memory controller 17 opens the SMRAM 27 (including setting an AB segment, along with TSEG and HSEG segments). The chipset memory controller 17 also enables the CPU 11 to access the SMRAM 27 at block 33. The CPU 11 saves the current state of the processor to SMRAM 27.

The CPU 11 executes the SMI dispatcher (or SMI handler) 12. The SMI dispatcher 12 changes the caching setting as soon as possible to cache the extended memory 28 and TSEG/HSEG with write-through (block 34). The SMI dispatcher 12 then services the SMI event (i.e., the event that invoked the SMI). After the SMI dispatcher 12 has completed its operation, it changes the cache settings to cache the extended memory 28 with write-back and set the TSEG/HSEG (the SMRAM 27) to be uncacheable at block 35, and then executes a resume (RSM) instruction (block 36). This instruction causes the processor to reload the saved context of the CPU 11, and switch back to the non-SMM. The chipset memory controller 17 is informed that the CPU 11 has switched back to non-SMM, and it closes the SMRAM 27 so that the CPU 11 cannot access SMRAM 27.

Thus, systems and methods that provides for cacheable above one megabyte system management random access memory have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method for use in a computer system having a central processing unit (CPU), a cache coupled to the CPU, and a chipset memory controller that interfaces the CPU to a memory, the memory comprising an extended memory that contains a system management random access memory (SMRAM), the method comprising:

setting the SMRAM to be uncacheable white operating outside of a system management mode;

transferring the CPU to a system management mode in response to execution of a system management interrupt;

changing one or more cache settings to cache the extended memory and the SMRAM with write-through;

servicing a system management interrupt event;

changing one or more cache settings to cache the extended memory with write-back and set the SMRAM to be uncacheable; and executing a resume instruction to exit the system management mode.

2. The method recited in claim 1 wherein the CPU further comprises a level 1 cache.

3. The method recited in claim 1 wherein the CPU further comprises a level 2 cache and a system management interrupt dispatcher.

4. The method recited in claim 3 wherein the system management interrupt dispatcher sets the extended memory and SMRAM to be cacheable and uncacheable by enabling predetermined TSEG/HSEG features of the chipset memory controller.

5. The method recited in claim 4 wherein the TSEG/HSBQ chipset features function to define boundaries of the SMRAM.

6. A computer system comprising:

a central processing unit (CPU) having a system management interrupt dispatcher;

a cache coupled to the CPU; and a chipset memory controller that interfaces the CPU to a memory, the memory comprising an extended memory that includes a system management random access memory (SMRAM);

wherein the system management interrupt dispatcher, sets the SMRAM to be uncacheable while operating outside of a system management mode, transfers the CPU to the system management mode in response to a system management interrupt, changes one or more cache settings to cache the extended memory and the SMRAM with write-through, changes, alter a system management interrupt event has been serviced, one or more cache settings to cache the extended memory with write-back and set the SMRAM to be uncacheable, and executes a resume instruction to exit system management mode.

7. The computer system recited in claim 6 wherein the cache comprises a level 1 cache that is part of the CPU.

8. The computer system recited in claim 6 wherein the cache further comprises a level 2 cache coupled to the CPU.

9. The computer system recited in claim 6 wherein the system management interrupt dispatcher sets the extended memory and the SMRAM to be cacheable and uncacheable by enabling predetermined TSEG/HSEG features of the chipset memory controller.

10. The computer system recited in claim 9 wherein the TSEG/HSBG chipset features function to define boundaries of the SMRAM.

11. The method recited in claim 1 wherein transferring the CPU to the system management mode comprises informing a chipset memory controller that the CPU is in the system management mode, and opening the SMRAM by the chipset memory controller.

12. The method recited in claim 1 wherein executing the resume instruction comprises:

executing the resume instruction to exit the system management mode;

reloading a saved context of the CPU;

transferring the CPU out of the system management mode; and closing the SMRAM by a chipset memory controller.

13. The method recited in claim 1 wherein the memory comprises a lower memory, an upper memory and the extended memory containing the SMRAM.

14. The computer system recited in claim 6 wherein the chipset memory controller, upon being informed that the CPU is in the system management mode, opens the SMRAM so that it is accessible by the CPU.

15. The computer system recited in claim 6 wherein the system management interrupt dispatcher, after executing the resume instruction, is further to, reload a saved context of the CPU;

transfer the CPU out of the system management mode; and close the SMRAM RAM by the chip set memory controller.

16. The computer system recited in claim 6 wherein the memory comprises a lower memory, an upper memory and the extended memory containing the SMRAM.

17. A method for providing cacheable SMRAM in a system having a processor and a memory, the memory comprising an extended memory that contains a system management random access memory (SMRAM), the method comprising:

transferring the processor to a system management mode in response to a system management interrupt;

setting the extended memory and the SMRAM to be cacheable with write-through;

servicing a system management interrupt event;

setting the extended memory to be cacheable with write-back;

setting the SMRAM to be uncacheable; and executing a resume instruction to transfer the processor out of the system management mode.

18. The method recited in claim 17 wherein the processor further comprises a level 1 cache, a level 2 cache and a system management interrupt dispatch.

19. The method recited in claim 17 wherein the system management interrupt dispatcher sets the extended memory and SMRAM to be cacheable and uncacheable by enabling predetermined TSHG/HSEG features of the chipset memory controller.

20. The method recited in claim 17 wherein the memory comprises a lower memory, an upper memory and the extended memory containing the SMRAM.

* * * * *